(12) United States Patent
Ali et al.

(10) Patent No.: US 9,444,712 B2
(45) Date of Patent: Sep. 13, 2016

(54) BANDWIDTH ON-DEMAND SERVICES IN MULTIPLE LAYER NETWORKS

(71) Applicant: Cisco Technology, Inc., San Jose, CA (US)

(72) Inventors: Zafar Ali, Hicksville, NY (US);
Muthurajah Sivabalan, Kanata (CA);
Clarence Filsfils, Brussels (BE); Jan Medved, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 292 days.

(21) Appl. No.: 13/957,533

(22) Filed: Aug. 2, 2013

(65) Prior Publication Data

US 2014/0143409 A1 May 22, 2014

Related U.S. Application Data

(60) Provisional application No. 61/729,119, filed on Nov. 21, 2012.

(51) Int. Cl.
*H04L 12/26* (2006.01)
*H04L 12/24* (2006.01)

(52) U.S. Cl.
CPC ....... *H04L 43/0876* (2013.01); *H04L 41/0896* (2013.01); *H04L 41/5051* (2013.01)

(58) Field of Classification Search
CPC .................................................. H04L 43/0876
USPC ......................................................... 709/224
See application file for complete search history.

(56) References Cited

U.S. PATENT DOCUMENTS

| 6,094,437 | A  | * | 7/2000  | Loehndorf, Jr. ..... H04L 12/4641 370/420 |
| 6,553,568 | B1 | * | 4/2003  | Fijolek et al. ................. 725/111 |
| 6,665,264 | B1 | * | 12/2003 | Davison et al. .............. 370/230 |
| 6,665,273 | B1 | * | 12/2003 | Goguen .............. H04L 12/5695 370/252 |
| 7,023,879 | B1 | * | 4/2006  | Sitaraman ........... H04L 41/0896 370/465 |
| 7,031,262 | B2 | * | 4/2006  | Vasseur et al. ................ 370/248 |
| 7,324,447 | B1 | * | 1/2008  | Morford ................ H04L 41/08 370/231 |
| 7,505,467 | B1 | * | 3/2009  | Buffam ....................... 370/395.2 |
| 7,590,075 | B2 | * | 9/2009  | Pirzada et al. ................ 370/254 |

(Continued)

FOREIGN PATENT DOCUMENTS

| EP | 2037626 A1    | 3/2009 |
| WO | 2010017176 A1 | 2/2010 |

OTHER PUBLICATIONS

Sanchez-Lopez et al., "Fast setup of end-to-end paths for bandwidth constrained applications in an IP/MPLS-ATM intergrated environment", 2006.*

(Continued)

*Primary Examiner* — O. C. Vostal
(74) *Attorney, Agent, or Firm* — Edell, Shapiro & Finnan, LLC

(57) ABSTRACT

Bandwidth usage for an existing communication tunnel between a first device and second device is monitored. A determination is made that additional bandwidth is required for communication between the first network device and the second network device. A determination is made that for the addition of the additional bandwidth would exceed available bandwidth for the existing tunnel. Additional bandwidth is established between the first network device and the second network device.

17 Claims, 6 Drawing Sheets

(56) References Cited

U.S. PATENT DOCUMENTS

| | | | |
|---|---|---|---|
| 7,668,971 B2* | 2/2010 | Vasseur et al. | 709/238 |
| 7,733,788 B1* | 6/2010 | Michalski et al. | 370/242 |
| 7,751,405 B1* | 7/2010 | Kompella | H04L 12/4633 370/254 |
| 7,831,700 B2* | 11/2010 | Lee | 709/223 |
| 8,005,133 B2* | 8/2011 | Smith | 375/228 |
| 8,009,669 B2* | 8/2011 | Lee | 370/389 |
| 8,102,877 B1* | 1/2012 | Liu et al. | 370/468 |
| 8,259,713 B2* | 9/2012 | Lawrence et al. | 370/388 |
| 8,264,962 B2 | 9/2012 | Vasseur et al. | |
| 8,312,145 B2* | 11/2012 | Rabie | H04L 12/5695 709/227 |
| 8,817,596 B2* | 8/2014 | Chen et al. | 370/221 |
| 8,885,463 B1* | 11/2014 | Medved et al. | 370/228 |
| 8,924,581 B1* | 12/2014 | Acharya et al. | 709/231 |
| 9,019,827 B1* | 4/2015 | Chan | H04L 12/2863 370/232 |
| 2001/0027211 A1 | 10/2001 | Houze | |
| 2001/0030785 A1* | 10/2001 | Pangrac et al. | 359/125 |
| 2002/0085559 A1* | 7/2002 | Gibson et al. | 370/392 |
| 2002/0191250 A1* | 12/2002 | Graves | H04Q 11/0066 398/82 |
| 2003/0088529 A1* | 5/2003 | Klinker | H04L 45/00 706/3 |
| 2003/0117973 A1* | 6/2003 | Thermond et al. | 370/328 |
| 2003/0177221 A1* | 9/2003 | Ould-Brahim | H04L 12/4641 709/223 |
| 2003/0226017 A1* | 12/2003 | Palekar | H04L 63/0428 713/168 |
| 2004/0114583 A1* | 6/2004 | Cetin et al. | 370/360 |
| 2004/0151181 A1* | 8/2004 | Chu | H04L 12/462 370/392 |
| 2004/0156313 A1* | 8/2004 | Hofmeister et al. | 370/229 |
| 2004/0186851 A1* | 9/2004 | Jhingan | H04L 12/58 |
| 2004/0215787 A1* | 10/2004 | Gibson | H04L 12/5695 709/227 |
| 2005/0063411 A1* | 3/2005 | Wang et al. | 370/437 |
| 2006/0039364 A1* | 2/2006 | Wright | 370/352 |
| 2006/0072474 A1* | 4/2006 | Mitchell | 370/252 |
| 2006/0165224 A1 | 7/2006 | Lee | |
| 2006/0187950 A1* | 8/2006 | Bou-Diab | H04L 12/185 370/432 |
| 2006/0250948 A1* | 11/2006 | Zamfir | H04L 45/02 370/216 |
| 2007/0009045 A1* | 1/2007 | Mohandas | 375/240.25 |
| 2007/0133406 A1* | 6/2007 | Vasseur | 370/230 |
| 2007/0160061 A1* | 7/2007 | Vasseur et al. | 370/395.4 |
| 2007/0208871 A1* | 9/2007 | Vasseur | H04L 45/50 709/230 |
| 2008/0112315 A1* | 5/2008 | Hu et al. | 370/230 |
| 2008/0212613 A1* | 9/2008 | Perkinson et al. | 370/475 |
| 2009/0086632 A1* | 4/2009 | Folkes et al. | 370/232 |
| 2009/0182894 A1* | 7/2009 | Vasseur et al. | 709/239 |
| 2010/0002724 A1* | 1/2010 | Turlington et al. | 370/468 |
| 2010/0121972 A1* | 5/2010 | Samuels et al. | 709/231 |
| 2011/0280580 A1* | 11/2011 | Wexler | H04L 45/22 398/79 |
| 2012/0163224 A1* | 6/2012 | Long | H04L 41/5025 370/252 |
| 2012/0269053 A1* | 10/2012 | Yu | H04L 12/4641 370/216 |
| 2013/0286846 A1* | 10/2013 | Atlas | H04L 45/34 370/236 |
| 2013/0336108 A1* | 12/2013 | Vasseur et al. | 370/225 |

OTHER PUBLICATIONS

Busschbach, "Toward QoS-Capable Virtual Private Networks", 1998.*
Taylor et al., "System-wide Information Management for Aeronautical Communications", 2004.*
Metz, "Layer over IP/MPLS", 2001.*
Huang et al., "Bridging Core and Edge Networks for Residential Subscribers", 2000.*
Ahn et al., "Design and Implementation of MPLS Network Simulator Supporting LDP and CR-LDP", 2000.*
Bradner, "Key words for use in RFSs to Indicate Requirement Levels", RFC 2119, 1997.*
Awduche et al., "RSVP—TE: Extensions to RSVP for LSP tunnels", RFC 3209, 2001.*
Donnet er al., "Revealing MPSL Turnnels Obscured form Traceroute", 2012.*
Kuhn et al., "Current and Advanced Protocols over ATM: Evaluation, Implementation and Experiences", 1996.*
Gredler et al., "Traffic Engineering by Layer-2 Overlay Networks", Chapter 14 "Traffic Engineering and MPLS", "The Complete IS-IS Routing Protocol", 2005.*
Farrel et al., "Crakback Signaling Extensions for MPLS and GMPLS RSVP—TE", RFC 4920, 2007.*
Farrel et al., "A Path Computation Element (PCE)—Based Architecture", RFC 4655, 2006.*
Pan et al., "Fast Reroute Extensions to RSVP—TE for LSP Tunnels", RFC 4090, 2005.*
Vasseur et al., "Patch Computation Element (PCE) Communication Protocol (PCEP)", RFC 5440, 2009.*
Aggarwal et al., "Extensions to Resource Reservation Protocol—Traffic Engineering (RSVP—TE) for Point-to-Multipoint TE Label Switched Paths (LSPs)", RFC 4875, 2007.*
Faucheur et al., "Multi-Protocol Label Switching (MPLS) Support of Differentiated Services", RFC 3270, 2002.*
Gleeson et al., "A Framework for IP Based Virtual Private Networks", RFC 2764, 2000.*
Valencia et al., "Cisco Layer Two Forwarding (Protocol) 'L2F'", RFC 2341, 1998.*
Swallow, "MPLS Traffic Engineering", 1999.*
Rouse, "Layer Two Tunneling Protocol (L2TP) definition", 2007.*
MediaWiki, "Tunneling—GRE/L2TP", 2011.*
Cisco, "Implementing Tunnels", 2004.*
Haller et al., "The Internet of Things in an Enterprise Context", 2009.*
Cisco, "Cisco IOS XR MPLS Configuration Guide for the Cisco CRS Router Release 4.2.X", 2013.*
Zolfagharnasab, "Reducing Packet Overhead in Mobile IPv6", 2012.*
Mammoliti et al., "Layer 2 Tunneling Protocol (L2TP) Access Line Information Attribute Value Pair (AVP) Extensions", RFC 5515, 2009.*
Farrel et al., "Inter-Domain MPLS and GMPLS Traffic Engineering—Resource Reservation Protocol—Traffic Engineering (RSVP—TE) Extensions", RFC 5151, 2008.*
Lang et al., "RSVP—TE Extensions in Support of End-to-End Generalized Multi-Protocol Label Switching (GMPLS) Recovery", RFC 4872, 2007.*
Faucheur, "Aggregation of Resource ReSerVation Protocol (RSVP) Reservations over MPLS TE/DS-TE Tunnels", RFC 4804, 2007.*
Faucheur, "Protocol Extensions for Support of Diffserv-aware MPLS Traffic Engineering", RFC 4124, 2005.*
Faucheur et al., "Requirements for Support of Differentiated Services-aware MPLS Traffic Engineering", RFC 3564, 2003.*
Berger, "Generalized Multi—Protocol Label Switching (GMPLS) Signaling Resource ReserVation Protocol—Traffic Engineering (RSVP—TE) Extensions", RFC 3473, 2003.*
Berger, "Generalized Multi-Protocol Label Switching (GMPLS) Signaling Functional Description", RFC 3471, 2003.*
Faucheur et al., "Multi-Protocol Label Switching (MPLS) Support for Differentiated Services", RFC 3270, 2002.*
Townsley et al., "Layer Two Tunneling Protocol 'L2TP'", RFC 2661, 1999.*
Rosen et al., "Multiprotocol Label Switching Architecture", RFC 3031, 2001.*
Andersson et al., "LDP Specification", RFC 3036, 2001.*
International Search Report and Written Opinion in counterpart International Application No. PCT/US2013/070902, mailed Mar. 28, 2014, 10 pages.

* cited by examiner

BANDWIDTH ON-DEMAND SERVICES IN MULTIPLE LAYER NETWORKS

PRIORITY CLAIM

This application claims the benefit of Provisional Application No. 61/729,119, filed Nov. 21, 2012, the contents of which are hereby incorporated by reference.

TECHNICAL FIELD

The present disclosure relates to computer networks, and in particular, multilayer computer networks.

BACKGROUND

Network infrastructures may employ multiple layer networks. For example, a network may comprise both an Internet Protocol (IP) network layer, as well as an optical network layer. Often, the separate network layers will exhibit different bandwidth availability at a particular time and for a particular application.

Multiprotocol Label Switching (MPLS) is a mechanism in high-performance networks that directs data from one network node to the next based on short path labels rather than long network addresses, avoiding complex lookups in a routing table. The labels identify virtual links (paths) between distant nodes rather than endpoints. MPLS can encapsulate packets of various network protocols. The Generalized Multi-Protocol Label Switching (GMPLS) is a protocol suite extending MPLS to manage further classes of interfaces and switching technologies other than packet interfaces and switching, such as time division multiplex, layer-2 switch, wavelength switch and fiber-switch.

A path computation element (PCE) is a system component, application, or network node that is capable of determining and finding a suitable route for conveying data between a source and a destination. In MPLS and GMPLS networks, the PCE is used to determine the path through the network that traffic should follow, and provides the route for each Label Switch Path (LSP) that is set up. A PCE might be a network node, network management station, or dedicated computational platform that is resource-aware and has the ability to consider multiple constraints for sophisticated path computation.

DESCRIPTION OF EXAMPLE EMBODIMENTS

Overview

Bandwidth usage for an existing communication tunnel between a first device and second device is monitored. A determination is made that additional bandwidth is required for communication between the first network device and the second network device is received. A determination is made that the addition of the additional bandwidth would exceed available bandwidth for the existing tunnel. Additional bandwidth is established between the first network device and the second network device.

Example Embodiments

Figure 1:
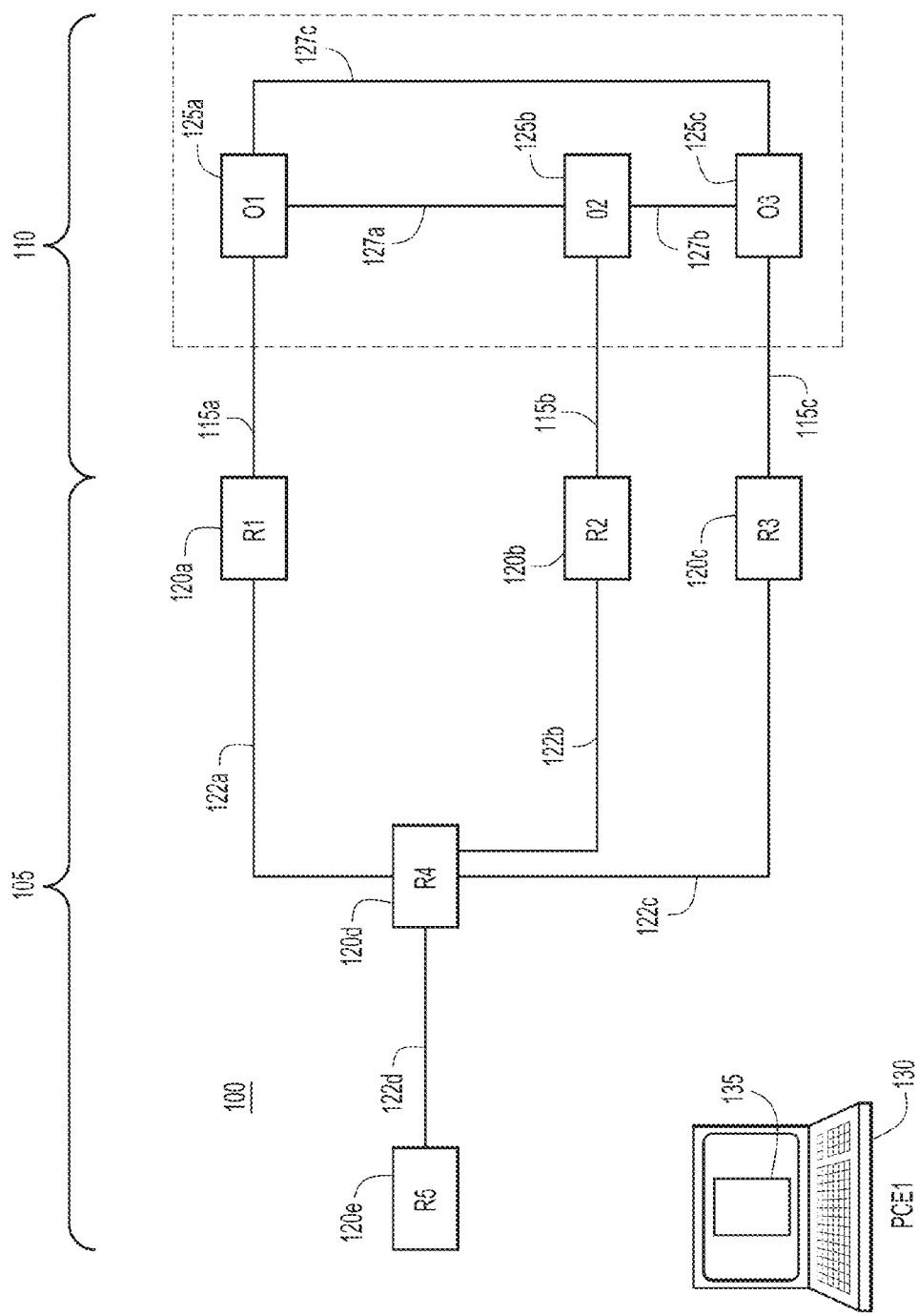
FIG. 1 illustrates a network environment configured to provide bandwidth on demand services in a network having multiple layers.

With reference made to FIG. 1, depicted therein is a network environment 100 comprising a first network layer 105 and a second network layer 110 which are in communication with each other through network layer interfaces 115 a-c. Other example networks may include three or more network layers.

According to example network environment 100, the first network layer 105 may be an Open System Interconnection (OSI) model layer 3 network such as an internet protocol (IP), or packet network. First network layer 105 includes multiple routers 120a-e interconnected through network links 122a-d. The second network layer 110 may be an optical network which resides at the OSI layer 0, and includes multiple optical nodes 125a-c interconnected through optical links 127a-c. Accordingly, the routers 120a-e can intercommunicate, as can optical nodes 125a-c. Furthermore, the first network layer 105 routers 120a-e can communicate with the second network layer 110 optical nodes 125a-c through network layer interfaces 115a-c.

While a layer 3 network layer is combined with an optical network layer in network environment 100, other example network environments are not limited to specific OSI layers, or network technology. For example, other example network environments may comprise OSI layer-2 networks combined with IP or layer 3 networks.

Also illustrated in FIG. 1 is stateful network device 130. According to the specific example of FIG. 1, network device 130 is a stateful path computation element (PCE). As used herein "stateful" refers to a device that is capable of tracking activity in a network, such as one or both of network layers 150 and 110. A stateful device not only tracks the amount of traffic in a network, but also tracks the source and destination of the traffic. Accordingly, if router 120a is communicating with router 120b through router 120d, stateful PCE 130 would be "aware" of the amount of traffic between routers 120a and 120b, the source and destination of the traffic, and the path for the traffic. While a single PCE 130 is illustrated in FIG. 1, the techniques described herein may be implemented in multiple cooperating PCEs.

Included in PCE 130 is bandwidth on-demand functional unit 135, which is configured to provide on-demand bandwidth for communications between one or more of routers 120a-e and optical nodes 125a-c. For example, two of routers 120a-e may be communicating through a communication tunnel passing through one or more network links 122a-d. Additional bandwidth for the communication may be required that exceeds the abilities of the maximum bandwidth of the current communication tunnel. Bandwidth on demand functional unit 135 is configured to provide additional, on-demand bandwidth as described below in reference to FIGS. 2-5.

Figure 2:
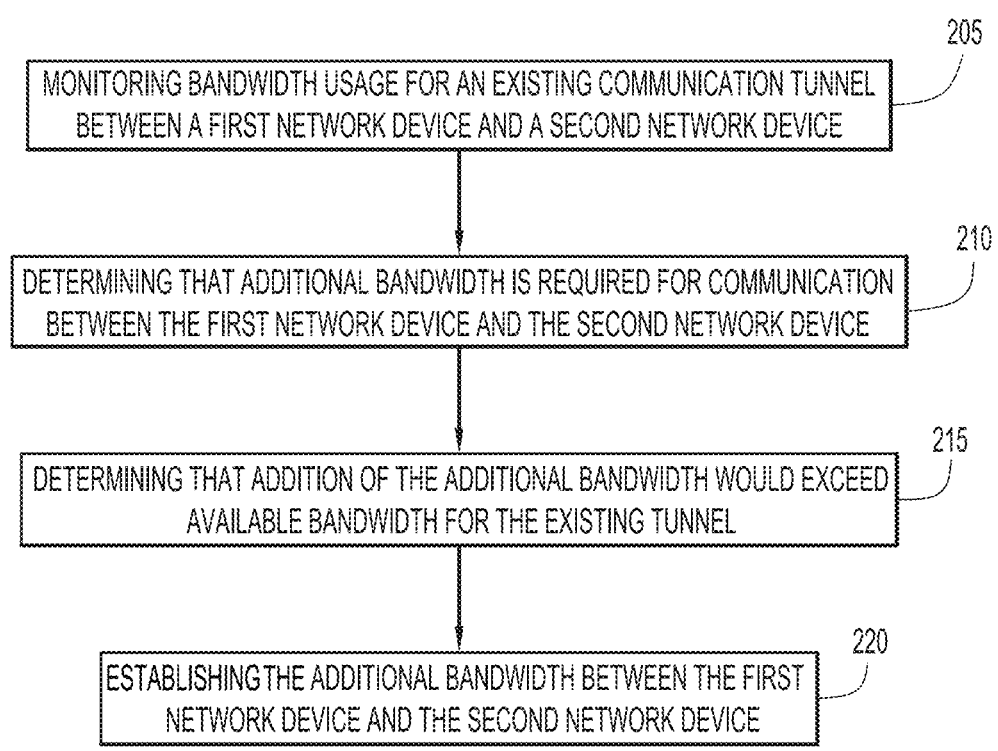
FIG. 2 is a flowchart illustrating a process for providing bandwidth on-demand services.

With reference now made to FIG. 2, depicted therein is a flowchart 200 illustrating a process for providing on-demand bandwidth between two or more network devices. The process begins in 205 where bandwidth usage for an existing communication tunnel between a first network device and a second network device is monitored. The monitoring may take place, for example, at a stateful network device, such as a PCE. A stateful PCE is configured to monitor current network communication tunnels. A non-stateful PCE, on the other hand, will simply calculate a network path in response to a request without any further monitoring of the communications.

In 210, a determination is made that additional bandwidth is required for communication between the network device and the second network device. According to one example, and as described below with reference to FIGS. 3-5, a request for additional bandwidth for communication between the first network device and the second network device may be received at a PCE. According to other examples, a stateful PCE will be able to determine when additional bandwidth is needed based on its monitoring of the communications between the first device and second device. In other words, the stateful PCE may trigger the addition of bandwidth, as described below with reference to blocks 215 and 220, without relying on receipt of an outside request.

In 215, a determination is made that the addition of the additional bandwidth would exceed the available bandwidth in the existing communication tunnel. For example, if a communication tunnel is using 7 gigabytes of bandwidth over 10 gigabyte network links, a request for an additional 8 gigabytes of bandwidth could not be fulfilled over the established communication tunnel. Remaining with the example of the stateful PCE, because the stateful PCE monitors the communications between the two network devices, it can perform the calculations necessary to determine whether or not the current communication tunnel is capable of providing the requested bandwidth. A non-stateful PCE, on the other hand, would not be aware that the existing tunnel is in use, much less, the current bandwidth utilization of the existing tunnel. Accordingly, a non-stateful PCE could not easily determine whether or not the request for additional bandwidth could be met by the network links utilized by the existing tunnel.

According to other examples, the established communication tunnel may communicate through networks links which can handle additional bandwidth, even though the bandwidth allocation for the established communication tunnel is less than the bandwidth needed for the communications between the first device and the second device. A stateful PCE may determine that the bandwidth necessary for communication exceeds the bandwidth allocation for the existing communication tunnel.

Finally, in 220, additional bandwidth is established between the first network device and the second network device. For example, an additional communication tunnel may be established between the first device and the second device in order to fulfill the bandwidth request received in 210. The additional communication tunnel may span two or more network layers, as shall be described below in reference to FIGS. 3-5. According to other examples, the bandwidth allocation for the existing communication tunnel may be expanded.

Figure 3:
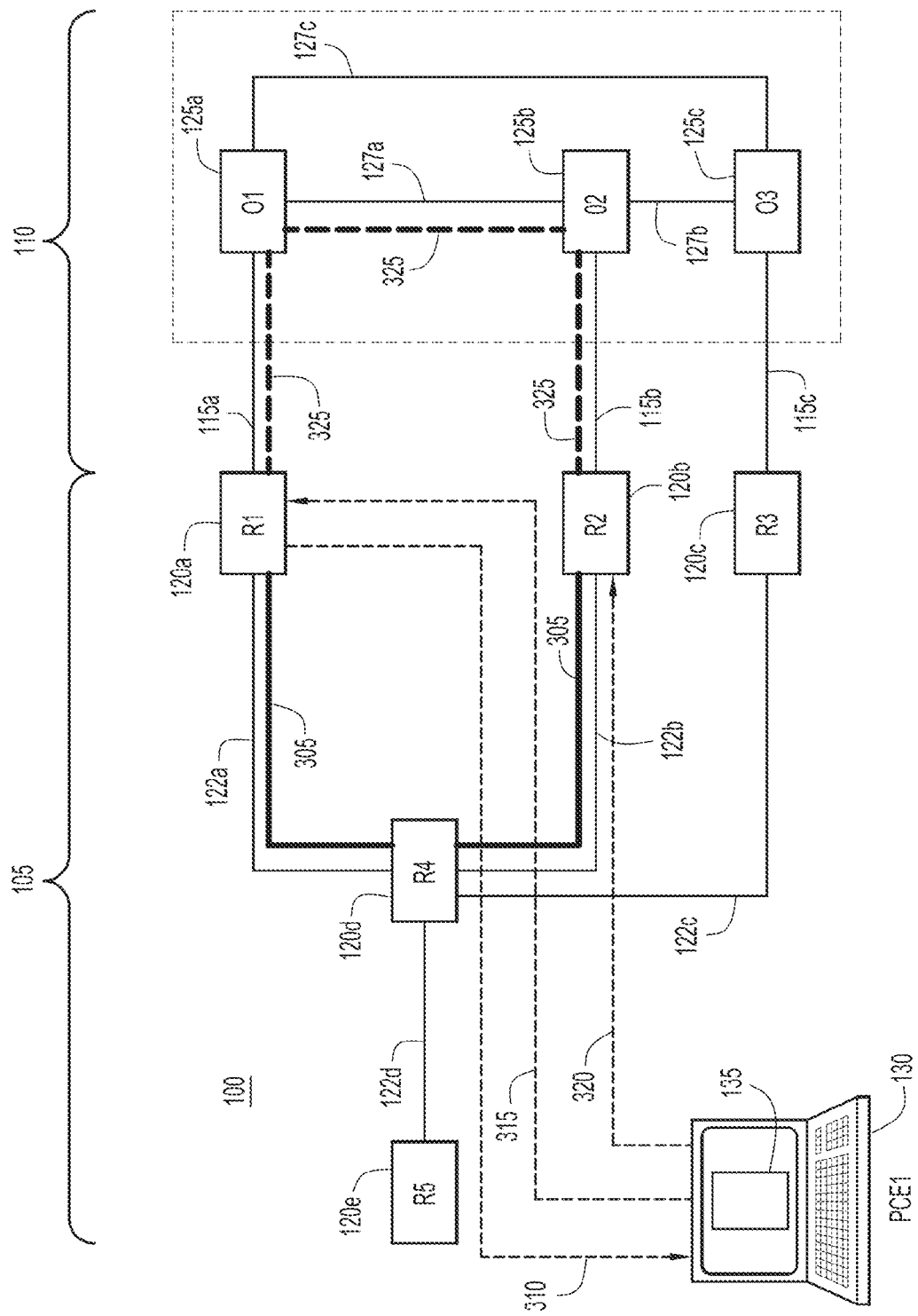
FIG. 3 illustrates an example network environment and the accompanying network processes utilized in providing bandwidth on-demand services.

Turning now to FIG. 3, depicted therein is an illustration of providing additional bandwidth through an additional communication tunnel which spans more than one network layer. As illustrated, a network environment similar to that of FIG. 1 is depicted, and therefore, like reference numerals have been used to refer to like elements.

Initially in FIG. 3, an existing communication tunnel 305 has been established between router 120a and router 120b. Specifically, existing tunnel 305 comprises network link 122a, router 120d and network link 122c. According to the example of FIG. 3, each network link 122a-d is a 10 gigabyte link. Accordingly, if the communications between router 120a and 120b require 7 gigabytes of bandwidth, communication tunnel 305 is sufficient to handle the bandwidth requirements.

PCE 130 monitors the communications over communication tunnel 305 until bandwidth request message 310 is received by PCE 130 from router 120a. If request message 310 is a message requesting an additional 2 gigabytes of bandwidth, PCE 130 may respond by expanding existing communication tunnel 305. Specifically, because links 122a and 112b are 10 gigabyte links, and a total of 9 gigabytes is needed (the existing 7 gigabytes plus the additional 2 gigabytes), PCE may be to determine that existing communication tunnel may be expanded to accommodate the additionally requested bandwidth. On the other hand, if request message 310 requests an additional 8 gigabytes of bandwidth for communication between router 120a and router 120b, network links 122a and 122b are incapable of supporting a total bandwidth of 15 gigabytes.

Because PCE 130 is stateful, and has been monitoring existing tunnel 305, PCE 130, and bandwidth on demand functional unit 135 in particular, is aware that tunnel 305 is incapable of fulfilling the request for an additional 7 gigabytes of bandwidth as requested in request message 310. Accordingly, bandwidth on demand functional unit 135 will send message 315 to router 120a, providing a path for an additional communication tunnel 325 through second network layer 110.

If PCE 130 is aware of the topology of both first network layer 105 and second network layer 110, message 315 sent by bandwidth on-demand functional unit 135 may explicitly define the entire path from router 120a to router 120b through the second network layer 110. For example, if router 120a and router 120b communicate according to a label switched path (LSP) protocol, such as Multiprotocol Label Switching (MPLS) or Generalized Multiprotocol Label Switching (GMPLS), and PCE 130 is aware of the topology of second network layer 110, message 315 may include the entire LSP from router 120a to 120b. Specifically, message 315 may explicitly define the path for tunnel 325 which includes network layer interface 115a, optical node 125a, optical path 127a, optical node 125b, and network layer interface 115b. Upon receiving message 315, router 120a may establish a circuit for tunnel 325, and begin communicating through communication tunnel 325. Message 315 may take the form of an LSP "Create" message sent according to the Path Computation Element Protocol (PCEP). Specifically, message 315 may include an explicit route object (ERO) defining the path from router 120a to router 120b.

In order to establish tunnel 325, router 120a may first send the LSP data to router 120b, thereby establishing a circuit for tunnel 325. The sending of the LSP information to router 120b may take the form of a Resource Reservation Protocol—Traffic Engineering (RSVP-TE) message. An RSVP-TE generally allows for the establishment of MPLS LSPs, taking into consideration network constraint parameters such as available bandwidth and explicit hops.

According to another example, the creation of tunnel 325 includes PCE 130 sending message 320 to router 120b in addition to sending message 315 to router 120a. Each of messages 315 and 320 include the LSP information necessary to establish tunnel 325 for a bi-directional GMPLS LSP.

When the establishment of bandwidth on demand communication tunnel 325 is implemented in a GMPLS environment, the techniques herein may extend the PCEP LSP Create Message with the LSP_TUNNEL_INTERFACE_ID Object. Specifically, the LSP_TUNNEL_INTERFACE_ID Object is configured to communicate LSP provisioning information from the ingress node (router 120a) to the egress node (router 120b).

When the single sided provisioning model is used (i.e. only message 315 is sent from PCE 130, and message 320 is not utilized) in which RSVP-TE signaling is implemented, an LSP Request Message with an LSP_TUNNEL_INTERFACE_ID object in the RSVP TE Path message is sent from router 120a to router 120b.

Once new communication tunnel 325 is established, PCE 130 will continue to monitor the communications between routers 120a and 120b. If the bandwidth requirements for the communications change, PCE 130 may dynamically alter one or more of the communication tunnels between routers 120a and 120b. For example, if the bandwidth demands remain above 10 gigabytes, but less than the 15 gigabytes currently reserved between tunnels 305 and 325, one or both of tunnels 305 and 325 may be reduced in size. Similarly, if the required bandwidth for the communications between router 120a and 120b drop below 10 gigabytes, the size of communication tunnels 305 and 325 may be altered, including the elimination of one of the tunnels. For example, if the bandwidth requirement for the communications between routers 120a and 120b is determined to be 9 gigabytes, communication tunnel 305 may be expanded to handle 9 gigabytes of bandwidth, and communication tunnel 325 may be eliminated. On the other hand, PCE 130 may accommodate the change by simply reducing the bandwidth allocation for tunnel 325 to 2 gigabytes without making any changes to the bandwidth allocation for tunnel 305. Similarly, PCE 130 may accommodate the change by simply reducing the bandwidth allocation for tunnel 305 to 1 gigabyte without making any changes to the bandwidth allocation for tunnel 325.

Figure 4:
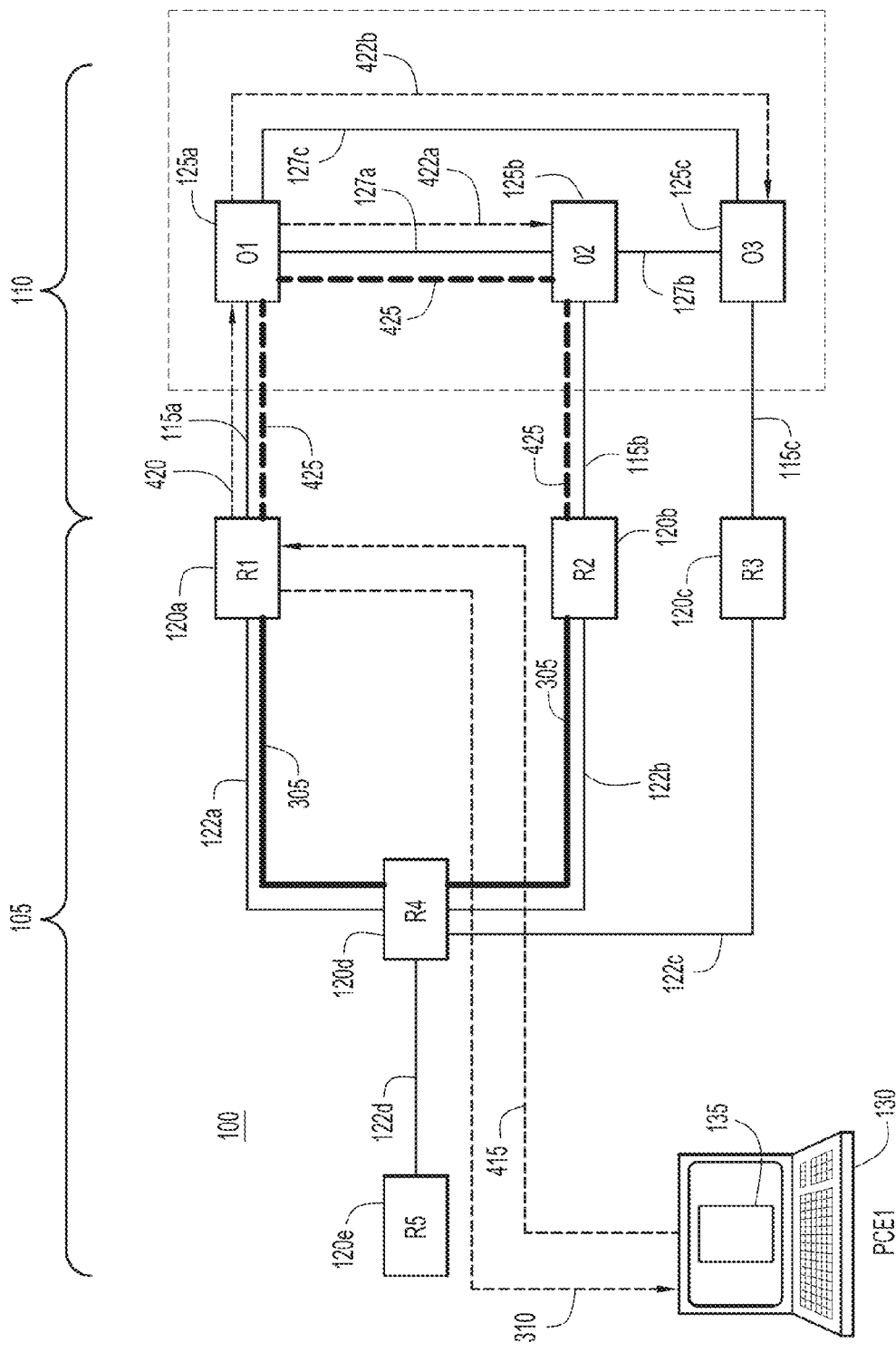
FIG. 4 illustrates a second example network environment and the accompanying network processes utilized in providing bandwidth on-demand services.

With reference now made to FIG. 4, unlike the example of FIG. 3, PCE 130 may only be aware of the topology of first network layer 105. For example, PCE 130 may be aware that network layer interfaces 115a-c all connect to second network later 110, but PCE 130 is unaware of the underlying structure of second network layer 110. Specifically, PCE 130 would not be aware of the structure and arrangement of optical nodes 125a-c and optical links 127a-c.

PCE 130 may have partial awareness of network layer interfaces through signaling provided by routers 120a-c, the routers connected to the second network layer 110 through network layer interfaces 115a-c. Specifically, PCE 130 may be receiving minimal reachability information for the optical network. In particular, PCE 130 may learn the optical addresses associated with routers 120a-c through one or more means. For example, routers 120a-c may advertise or flood network layer 105 with messages indicating that routers 120a-c have virtual interconnectivity. These signaling messages may include the optical addresses for routers 120a-c. According to other examples, the optical addresses for routers 120a-c may be tagged addresses in an intermediate to intermediate system (ISIS) network. In additional examples, the optical addresses for routers 120a-c may be flooded to first network layer 105 as stabs in an Open Shortest Path First (OSPF) environment.

Accordingly, while the process of establishing on-demand bandwidth begins in a manner similar to that of FIG. 3, because PCE 130 is not aware of the full topology of second network layer 110, the determination of the path through second network layer 110 is accomplished through different means.

As with the example of FIG. 3, each network link 122a-d in FIG. 4 is a 10 gigabyte link. Accordingly, if the communications between router 120a and 120b require 7 gigabytes of bandwidth, communication tunnel 305 is sufficient to handle the bandwidth requirements.

PCE 130 monitors the communications over communication tunnel 305 until bandwidth request message 310 is received by PCE 130 from router 120a. Request message 310 requests an additional 8 gigabytes of bandwidth for communication between router 120a and router 120b. Just as described above in reference to FIG. 3, network links 122a and 122b of FIG. 4 are only 10 gigabyte links, and therefore, are incapable of supporting a total bandwidth of 15 gigabytes. Because PCE 130 is stateful, and has been monitoring existing tunnel 305, PCE 130, and bandwidth on-demand functional unit 135 in particular, is aware that tunnel 305 is incapable of fulfilling the request in message 310.

In response to message 310, bandwidth on demand functional unit 135 will send message 415 to router 120a. But, unlike message 315 of FIG. 3, message 415 does not define an explicit path through second network layer 110. Instead, message 415 will include second network layer 110 addresses for router 120a and router 120b. Specifically, because router 120a and router 120b are connected to the second network layer 110 through network layer interface 115a and network layer interface 11b, respectively, routers 120a and 120b will have a second network layer 110 address, or an optical address, associated with them.

Upon receipt of message 415, in order to determine the path through second network layer 110, router 120a may attempt to establish a successful path through a trial-and-error process. Specifically, router 120a may send message 420 to optical node 125a, which also includes the optical addresses for router 120a and router 120b. Upon receiving message 420, optical node 125a can complete the path for the additional communication through, for example, signaling over the second network layer 110. Specifically, optical node 125a may use GMPLS signaling to determine a path from network layer interface 115a, through second layer network 110 and out network layer interface 115b to router 120b.

Specifically, optical node 125a may send out or flood a plurality of signaling messages 422a and 422b, such as GMPLS signaling messages, to communicate with the other optical nodes in second network layer 110 in an attempt to find a path through second network layer 110 that can fulfill the bandwidth request made in message 310. Upon determining a successful path through the second network layer 110, communication tunnel 425 is established between router 120a and router 120b, and communication is commenced through second network layer 110.

As with the example of FIG. 3, PCE 130 will continue monitor the communications between router 120a and 120b, dynamically changing the bandwidth allocations for communication tunnels 305 and 425, as needed.

Figure 5:
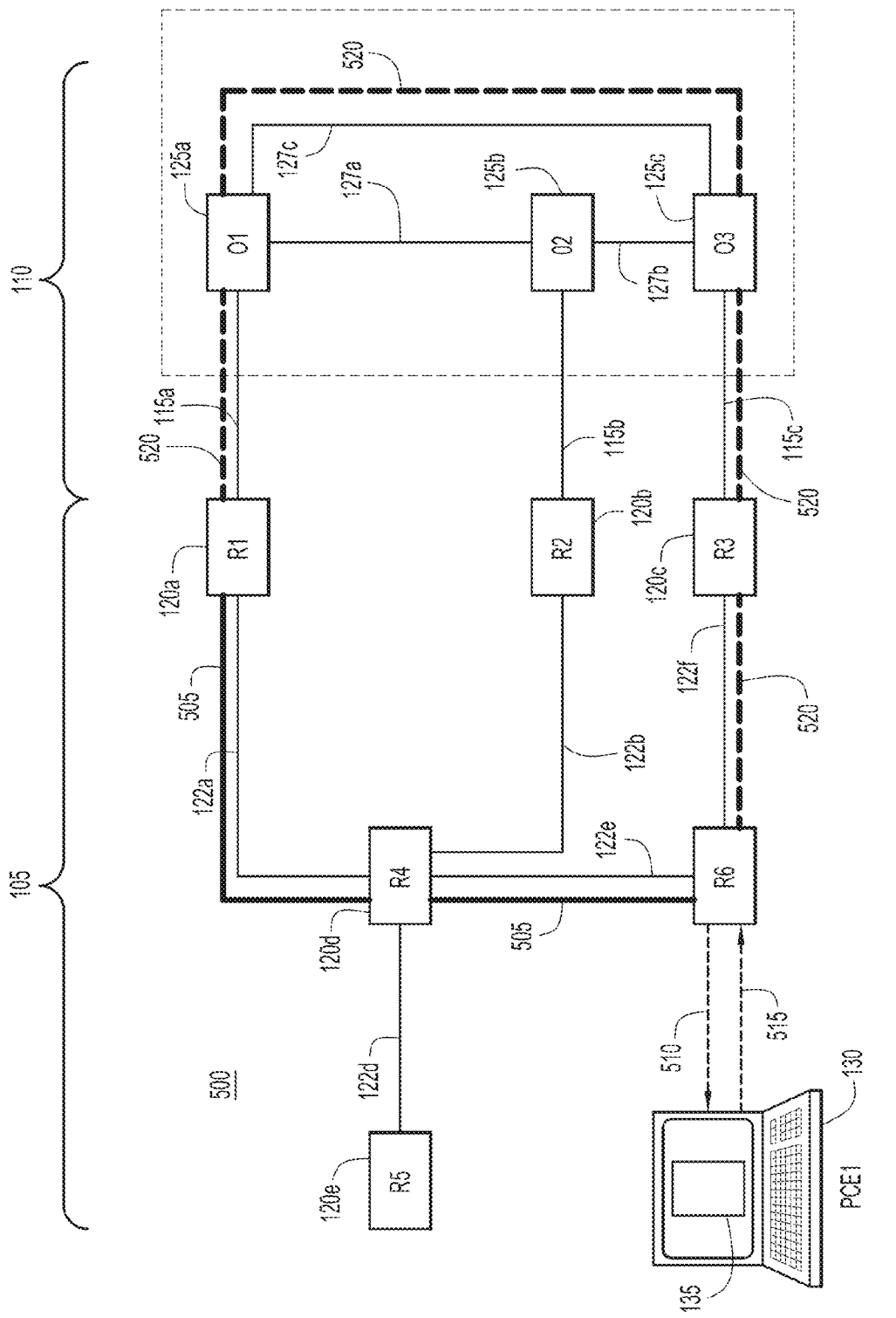
FIG. 5 illustrates a third example network environment and the accompanying network processes utilized in providing bandwidth on-demand services.

With reference now made to FIG. 5, depicted therein is another example network environment 500 which is configured to provide on-demand bandwidth between network devices. Network environment 500 is similar to network environment 100 of FIGS. 1, 3 and 4, and therefore, like reference numerals have been used to reference to like components. Network environment 500 differs from the previous examples in that an additional router, router 120*f*, is included in network environment 500, as have been network links 122*e* and 122*f*. Furthermore, instead of communicating with router 120*b*, router 120*a* communicates with router 120*f* through tunnel 505. As with the previous examples, the communications between router 120*a* and 120*f* initially require 7 gigabytes of bandwidth. Subsequently, a request 510 is sent from router 120*f* to stateful PCE 130 requesting an additional 8 gigabytes of bandwidth, a request that cannot be fulfilled through 10 gigabyte links 122*a* and 122*e* as they are already providing 7 gigabytes of bandwidth through tunnel 505. Accordingly, PCE 130 will establish an on-demand tunnel through second network layer 110.

Unlike the example of FIG. 3, router 120*f* is not located on the ingress or egress to second layer network 110. Furthermore, when message 515 is sent to router 120*f* to establish a bandwidth on demand tunnel, message 515 does not include an explicit path for the new on-demand tunnel. This is because security and/or confidentiality concerns may prevent PCE 130 from explicitly defining the entire path through second layer network 110. Accordingly, included in message 515 is an ERO which defines the path from router 120*f* to router 120*c*, and one or more path keys which may be used by router 120*c* and other subsequent nodes to determine the rest of the path through the first network layer 105 and the second network layer 110. A path key is used in place of a segment of the path of an LSP when the LSP is signaled, when the path of the LSP is reported by signaling, or when the LSP's path is generated by a PCE. This allows the exact path of the LSP to remain confidential through the substitution of confidential path segments (CPSs) by these path keys. Once received by the appropriate node, the node can translate the CPS into the next hop in the path.

Accordingly, message 515 may include an ERO which defines the hop from router 120*f* to 120*c*, and also includes three CPSs, one CPS for the hop from router 120*c* to optical node 125*a*, one CPS for the hop from optical node 125*c* to optical node 125*a*, and one CPS for the hop from optical node 125*a* to router 120*a*, each of which includes a path key. Furthermore, the portion of the ERO defining the path to router 120*c* may be "loose," meaning it is not explicitly defined by the ERO, and the routing devices along the path may determine the specific hops necessary to reach router 120*c*.

Once received at router 120*c*, the corresponding path key in the CPS in the LSP will be translated by node 120*c*. Accordingly, the LSP will be signaled to optical node 125C where the next path key in the next CPS will be translated. This process will continue until the LSP has been signaled to router 120*a*, at which time bandwidth on-demand communication tunnel 520 is established.

As with the examples of FIGS. 3 and 4, PCE 130 will continue monitor the communications between router 120*a* and 120*b*, dynamically changing the bandwidth allocations for communication tunnels 505 and 520, as needed.

Figure 6:
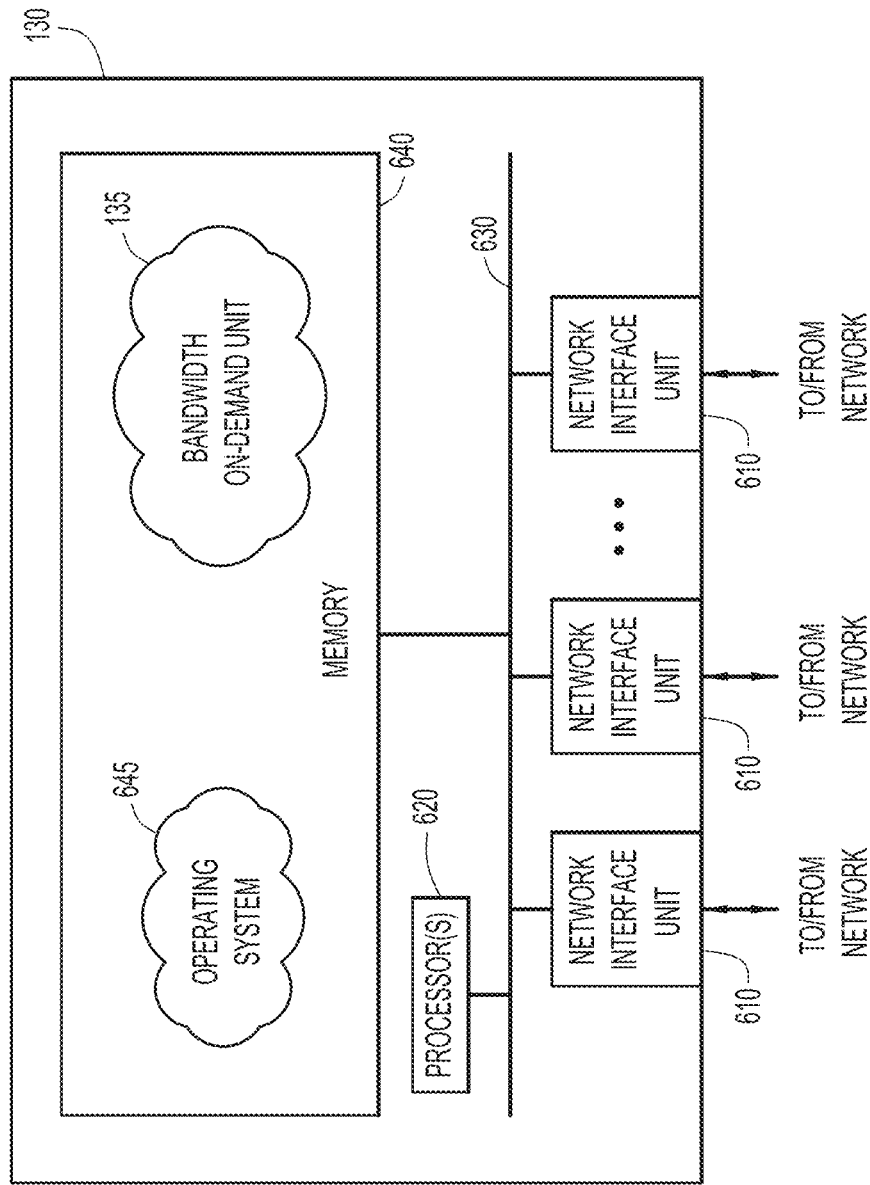
FIG. 6 is a block diagram of a network device configured to provide bandwidth on-demand services.

Turning now to FIG. 6, depicted therein is an example block diagram of a network device, e.g., stateful network device 130 (e.g. a PCE), configured to perform the techniques described herein in connection with FIGS. 1-5. The stateful network device 130 comprises one or more network interface units 610 (e.g., network interface cards) to enable communication over a network, processor(s) 620, bus 630, and memory 640. The memory 640 contains software instructions for operating system 645 and bandwidth on-demand functional unit 135.

Memory 640 may comprise read only memory (ROM), random access memory (RAM), magnetic disk storage media devices, optical storage media devices, flash memory devices, electrical, optical, or other physical/tangible (e.g., non-transitory) memory storage devices. The processor 620 is, for example, a microprocessor or microcontroller that executes instructions for stateful network device 130. Thus, in general, the memory 640 may comprise one or more tangible (non-transitory) computer readable storage media (e.g., a memory device) encoded with software comprising computer executable instructions and when the software is executed (by the processor 620), and in particular bandwidth on-demand functional unit 135, it is operable to perform the operations described herein in connection with FIGS. 1-5. Specifically, bandwidth on-demand functional unit 135 includes instructions that allow processor 620 to generate LSPs for bandwidth on-demand communication tunnels as described herein.

The techniques taught herein provide substantial benefits to multilayer network configurations. For example, the use of a stateful PCE is one of the components of the Software Defined Networks (SDN). Accordingly, the techniques taught herein are easily deployed within SDN networks. Furthermore, the techniques taught herein build on the existing PCE and RSVP-TE framework.

Furthermore, the techniques described herein address important problems faced by service providers, such as how to efficiently use and share spare bandwidth in the optical network and create services in an on-demand basis. By implementing the techniques described herein, networks with fewer resources can provide the same level of availability as networks with higher cost infrastructures.

The above description is intended by way of example only.

What is claimed is:

1. A method comprising:
    monitoring, by a stateful network device, bandwidth usage of an existing communication tunnel between a first network device and a second network device, wherein the existing communication tunnel operates within a first network layer;
    determining, by the stateful network device, that additional bandwidth is required for communication between the first network device and the second network device;
    determining, by the stateful network device, that providing the additional bandwidth would exceed available bandwidth of the existing communication tunnel; and
    establishing the additional bandwidth between the first network device and the second network device via an additional communication tunnel, wherein the additional communication tunnel operates in parallel with the existing communication tunnel and operates at a second network layer, wherein establishing the additional communication tunnel comprises sending a first message from the stateful network device to a third network device in the first network layer that is located at an ingress point of the second network layer indicating a path of the additional communication tunnel, and sending a second message from the stateful network device to a fourth network device in the first network layer that is located at an egress point on the second network layer indicating the path of the additional communication tunnel.

2. The method of claim 1, wherein establishing the additional communication tunnel comprises establishing the additional communication tunnel via the second network layer that comprises an optical network.

3. The method of claim 1, wherein establishing the additional communication tunnel comprises:
determining a topology of the first network layer;
determining a topology of the second network layer; and
determining the path of the additional communication tunnel according to the topology of the first network layer and the second network layer.

4. The method of claim 1, wherein the first message and the second message are configured to cause the third network device located at the ingress point and the fourth network device located at the egress point to communicate through the second network layer to determine the path through the second network layer for the additional communication tunnel.

5. The method of claim 1, wherein:
sending the first message comprises sending a first GMPLS signaling message; and
sending the second message comprises sending a second GMPLS signaling message.

6. The method of claim 1, wherein the first message and the second message are configured to cause the third network device located at the ingress point and the fourth network device located at the egress point to communicate using GMPLS signaling messages.

7. The method of claim 1, further comprising:
sending a first explicit layer switched path (LSP) to the first network device for a portion of the additional communication tunnel from the first network device to the third network device located at an ingress point of the second network layer; and
sending a second explicit LSP to the second network device for a portion of the additional communication tunnel from the second network device to the fourth network device located at an egress point of the second network layer.

8. The method of claim 7 further comprising:
sending a first path key to the first network device for a portion of the additional communication tunnel from the third network device located at the ingress point to the fourth network device located at the egress point; and
sending a second path key to the second network device for the portion of the additional communication tunnel from the fourth network device located at the egress point to the third network device located at the ingress point.

9. The method of claim 1, wherein monitoring the bandwidth usage for the existing communication tunnel comprises monitoring at a stateful path computation element.

10. The method of claim 1, further comprising:
determining the bandwidth usage for the existing communication tunnel and the additional bandwidth exceed the actual communication between the first device and second device; and
reducing bandwidth between the first network device and the second network device.

11. The method of claim 1, wherein the first network layer comprises an Internet Protocol network, and the second network layer comprises an optical network.

12. The method of claim 11, wherein the Internet Protocol network is addressed at a first Open System Interconnection (OSI) model layer; and
wherein the optical network comprises an Intermediate to Intermediate System (ISIS) network that is addressed at a second OSI model layer.

13. An apparatus comprising
a network interface unit configured to enable network communications;
a memory; and
a processor coupled to the network interface unit and the memory, wherein the processor is configured to:
track network activity in a first network layer and a second network layer;
monitor bandwidth usage of an existing communication tunnel between a first network device and a second network device, wherein the existing communication tunnel operates within the first network layer;
determine that additional bandwidth is required for communication between the first network device and the second network device;
determine that addition of the additional bandwidth would exceed available bandwidth of the existing tunnel; and
establish the additional bandwidth between the first network device and the second network via an additional communication tunnel, wherein the additional communication tunnel operates in parallel with the existing communication tunnel and operates at the second network layer, wherein the additional bandwidth is established by sending a first message via the network interface unit to a third network device in the first network layer that is located at an ingress point of the second network layer indicating a path of the additional communication tunnel, and sending a second message via the network interface to a fourth network device in the first network layer that is located at an egress point on the second network layer indicating the path of the additional communication tunnel.

14. The apparatus of claim 13, wherein the processor is further configured to:
determine a topology of the first network layer;
determine a topology of the second network layer; and
determine the path of the additional communication tunnel according to the topology of the first network layer and the second network layer.

15. The apparatus of claim 13, wherein the first network layer comprises an Internet Protocol network addressed at a first Open System Interconnection (OSI) model layer; and
wherein the second network layer comprises an Intermediate to Intermediate System (ISIS) optical network that is addressed at a second OSI model layer.

16. A tangible, non-transitory computer readable medium comprising instructions that when executed by a processor cause the processor to:
monitor, by a stateful network device, bandwidth usage of an existing communication tunnel between a first network device and a second network device, wherein the existing communication tunnel operates within a first network layer;
determine, by the stateful network device, that additional bandwidth is required for communication between the first network device and the second network device;
determine, by the stateful network device, that addition of the additional bandwidth would exceed available bandwidth for the existing tunnel; and
establish the additional bandwidth between the first network device and the second network device to fulfill the request via an additional communication tunnel, wherein the additional communication tunnel operates in parallel with the existing communication tunnel and operates at a second network layer, and wherein the additional bandwidth is established by sending a first message from the stateful network device to a third network device in the first network layer that is located at an ingress point of the second network layer indicating a path of the additional communication tunnel, and sending a second message to a fourth network device in the first network layer that is located at an egress point on the second network layer indicating the path of the additional communication tunnel.

17. The tangible, non-transitory computer readable medium of claim 16, wherein the first network layer comprises an Internet Protocol network addressed at a first Open System Interconnection (OSI) model layer; and wherein the second network layer comprises an Intermediate to Intermediate System (ISIS) optical network that is addressed at a second OSI model layer.

* * * * *